US006422647B1

(12) United States Patent
Turudich

(10) Patent No.: US 6,422,647 B1
(45) Date of Patent: Jul. 23, 2002

(54) BICYCLE SEAT

(76) Inventor: Bob Turudich, 2106 Albury Ave., Long Beach, CA (US) 90815

( * ) Notice: Subject to any disclaimer, the term of this patent is extended or adjusted under 35 U.S.C. 154(b) by 0 days.

(21) Appl. No.: 09/760,526

(22) Filed: Jan. 11, 2001

(51) Int. Cl.[7] .................................................. B62J 1/00
(52) U.S. Cl. ...................................... 297/201; 297/202
(58) Field of Search ............................. 297/201, 202, 297/195.1

(56) References Cited

U.S. PATENT DOCUMENTS

| 537,376 A | * | 4/1895 | Wright et al. ............... 297/202 |
| 612,972 A | * | 10/1898 | Leech ........................ 297/201 |
| 5,823,618 A | | 10/1998 | Fox et al. |
| D416,394 S | | 11/1999 | Minkow et al. |
| D416,695 S | | 11/1999 | Minkow et al. |
| D417,560 S | | 12/1999 | Tollefson et al. |
| 6,039,395 A | | 3/2000 | Culbertson |
| D429,907 S | | 8/2000 | Minkow et al. |
| 6,106,059 A | | 8/2000 | Minkow et al. |
| D430,413 S | | 9/2000 | Minkow et al. |
| D430,744 S | | 9/2000 | Minkow et al. |
| D430,745 S | | 9/2000 | Minkow et al. |
| 6,193,309 B1 | * | 2/2001 | Gootter et al. .......... 297/201 X |

* cited by examiner

Primary Examiner—Anthony D. Barfield
(74) Attorney, Agent, or Firm—Edgar W. Averill, Jr.

(57) ABSTRACT

A bicycle seat which has right and left side portions, each having a rear area and an intermediate area, and a nose portion. The right side nose portion is spaced apart from the left side nose portion to provide a gap at the front of the seat of at least 1½ inches.

8 Claims, 4 Drawing Sheets

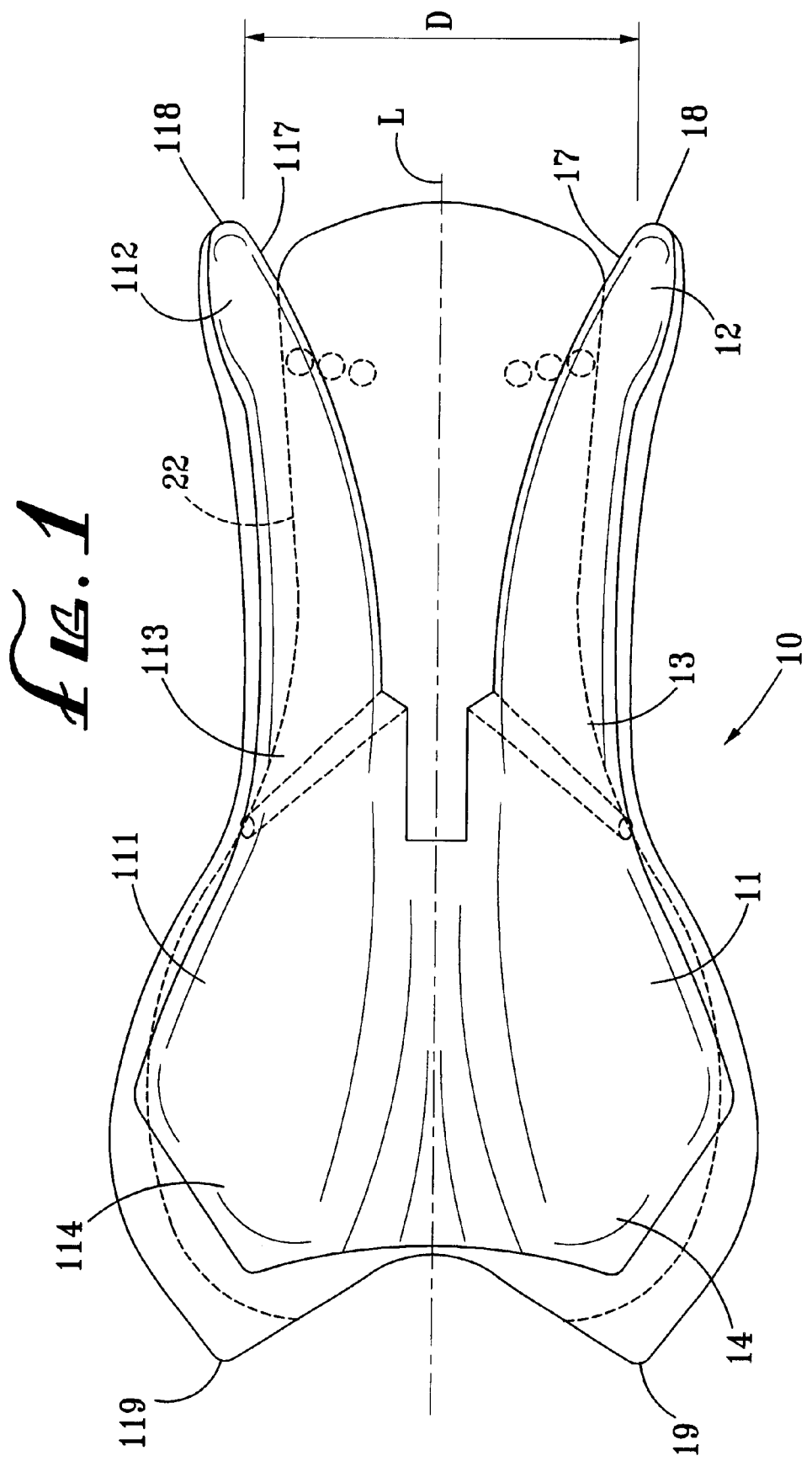

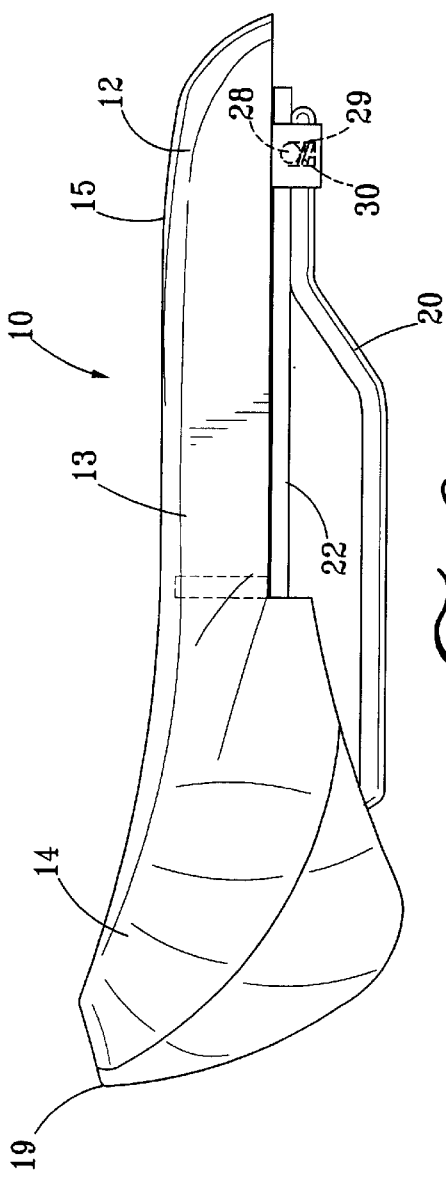
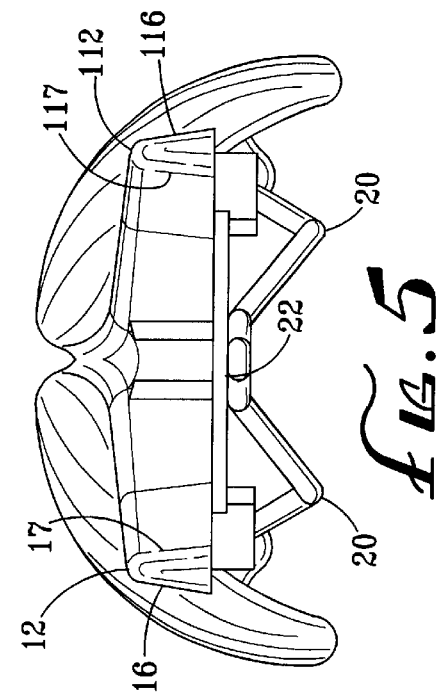
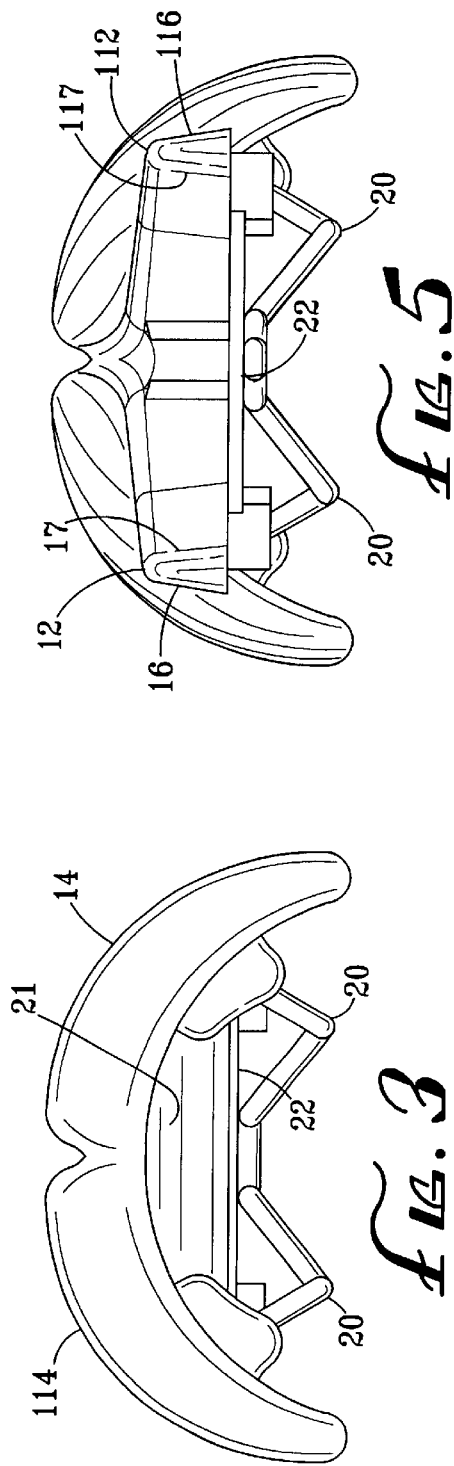

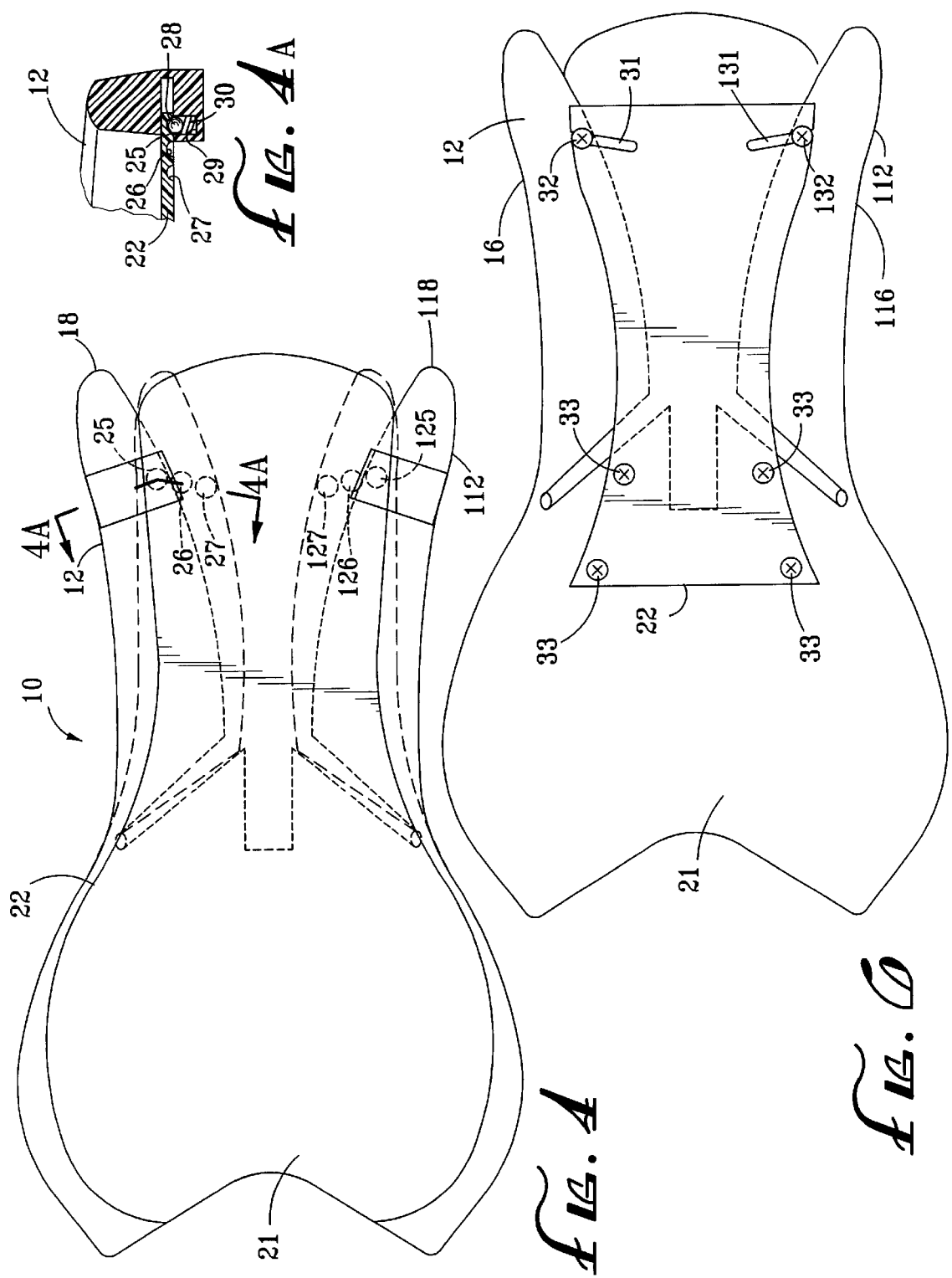

BICYCLE SEAT

BACKGROUND OF THE INVENTION

The field of the invention is bicycle seats and the invention relates more particularly to an ergonomic bicycle seat for serious bicycle riders who often ride for hours at a time. The discomfort and numbness caused by bicycle seats has been widely discussed in the prior art. Many improvements have recently been made to help alleviate various areas of discomfort and detailed anatomical discussions are provided setting forth benefits of various modifications. One such discussion is set forth in U.S. Pat. No. 6,106,059, which is incorporated by reference herein for background purposes. Additional discussion is provided in U.S. Pat. No. 6,039,395, which is also incorporated by reference herein for background purposes. Most of the recent seat designs have concentrated on removing weight along the perineal opening of the cyclist's pelvic bone. The purpose is to reduce compression on the pudendal arteries and nerves while not interfering with movement of the cyclist's legs in the pedaling motion.

It has been found that substantial additional comfort can be accomplished by providing an opening at the nose portion of the seat which results in a right side nose portion separated by a gap of at least 1½ inches from the left side nose portion.

BRIEF SUMMARY OF THE INVENTION

It is an object of the present invention to provide a bicycle seat for serious bicycle riders which provides further comfort in the nose area of the seat.

The present invention is for a bicycle seat comprising a base, including means for attaching the seat to a bicycle. A right side portion is held to the base and has a right side nose portion, a right side intermediate portion, and a right side rear portion. The right side nose portion includes a right side nose upper surface, a right side nose outer surface curved downwardly from said right side nose upper surface, and a right side nose inner surface curved downwardly from said right side nose upper surface. The right side nose outer and inner side surfaces terminate at a front edge. Similarly, a left side portion is also held to the base and has a left side nose portion, a left side intermediate portion, and a left side rear portion. The left side nose portion includes a left side nose upper surface, a left side nose outer surface curved downwardly from the left side nose upper surface, and a left side nose inner side surface curved downwardly from the left side nose upper surface. The left side nose outer side surface and the left side nose inner side surface terminate at a left side front edge and the right nose inner side surface and the left side nose inner side surface are separated a distance of at least 1 inches. Preferably, the distance between the right and left side nose portions is adjustable to optimize the comfort of an individual rider. A preferred adjustment is by way of a ball and detent so that the rider can adjust the separation distance easily while riding. Also preferably, the right and left nose portions are pivotally attached to the base in the intermediate area so that the rear portions of the seat are unaffected by the adjustment of the nose portions.

BRIEF DESCRIPTION OF THE DRAWINGS

FIG. 1 is a top view of the bicycle seat of the present invention.

FIG. 2 is a right side view thereof.

FIG. 3 is a rear view thereof.

FIG. 4 is a bottom view thereof.

FIG. 4A is an enlarged cross-sectional view taken along line 4A—4A of FIG. 4.

FIG. 5 is a front view thereof.

FIG. 6 is a bottom view of an alternate embodiment of the seat of FIG. 4.

DESCRIPTION OF THE PREFERRED EMBODIMENTS

Figure 7:
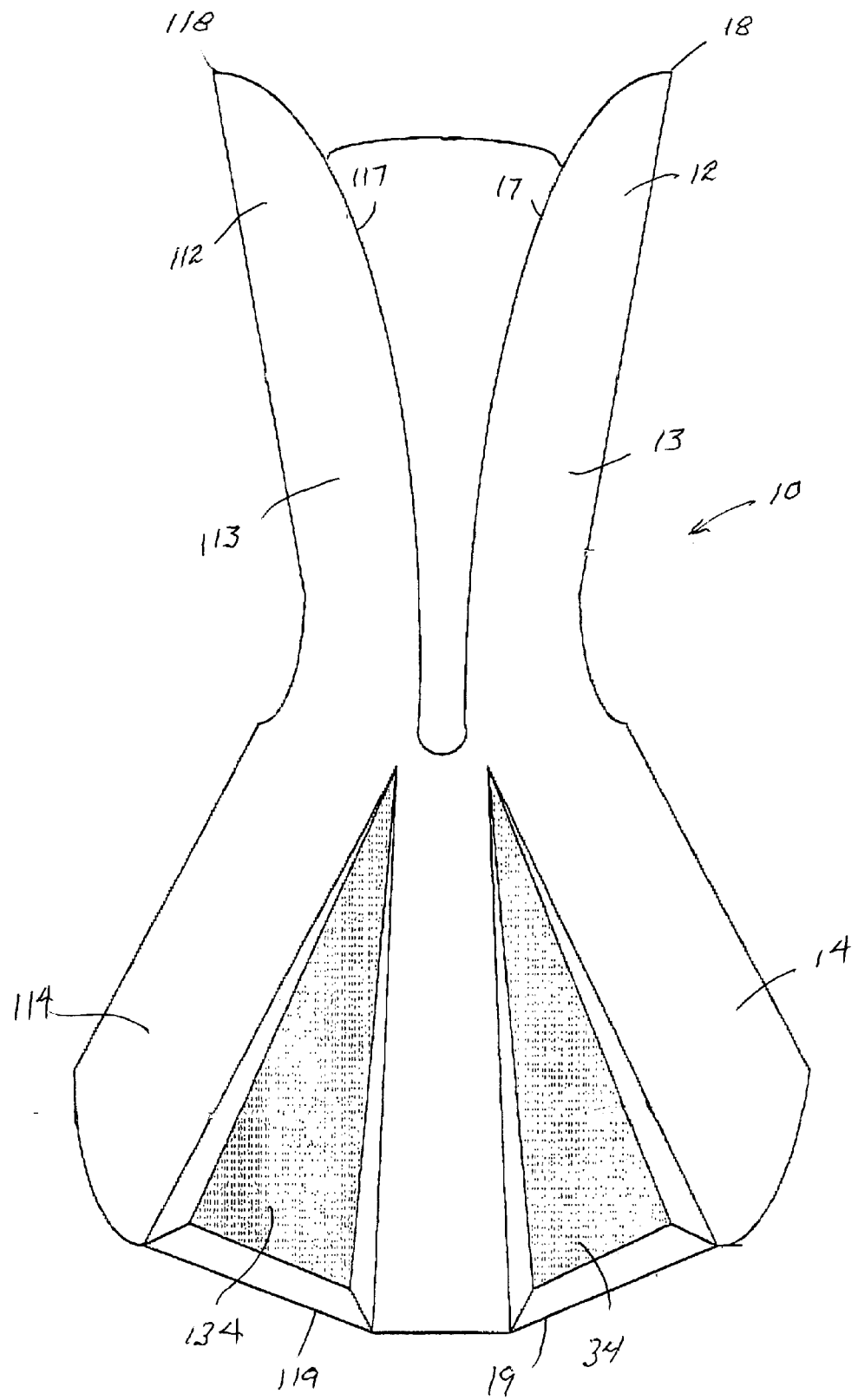
FIG. 7 is a plan view of an alternate embodiment of the seat in FIG. 4.

The bicycle seat of the present invention is shown in plan view in FIG. 1 and indicated generally by reference character 10. Bicycle seat 10 has a right side portion 11 and a left side portion 111. Since the right and left side portions are essentially mirror images, they will be indicated by reference characters separated by 100.

Seat 10 has a right side nose portion 12, a right side intermediate portion 13, and a right side rear portion 14. The analogous portions of the left side are indicated by reference characters 112, 113, and 114.

Right side nose portion 12 has an upper surface 15, a right side nose outer side surface 16, and a right side nose inner surface 17. The analogous portions of the left side are indicated by reference characters 115, 116, and 117.

The right side nose outer side surface 16 and inner side surface 17 meet at a right side front edge 18 which may be pointed as shown in FIG. 1 rounded or flat, depending upon the aesthetic appearance desired. The important feature of the bicycle seat of the present invention is the separation gap between the right side nose inner side surface 17 and the left side nose inner side surface 117. At the front of the seat, this distance is indicated by reference character D, which should be at least 1½ inches and may separate to a width of 3½ inches. This provides a spacing from an inner side surface to a central longitudinal axis L of ¾ of an inch to 1¾ of an inch. This spacing is preferably flared or angled outwardly towards the nose of the seat and extends back to at least the intermediate portion 13–113, and preferably to at least a mid point between the front edge 18–118 and the rear edge 19–119.

Turning now to FIG. 2, the seat is shown in side view. The construction of the seat comprising a rigid base, preferably an injection molded polymer, a cushioned area, and an outer wear surface. These elements are all conventional and well known to those skilled in the art and will not be discussed in detail, with the exception of the opening between the right and left nose portions and a method for adjusting the width between the right and left side nose portions. Conventional means are provided for affixing the seat to a bicycle and a connector bar 20 is shown in FIG. 2.

A rear view of the seat is shown in FIG. 3, and although the right side rear portion 14 is shown joined to the left side rear portion 114, this need not necessarily be the case as these two portions may be separated at the rear, since the important feature of the present invention is the configuration of the nose portion.

A bottom view of the seat is shown in FIG. 4 where a base generally indicated by reference character 21 is fabricated from a lightweight, but strong polymer.

One means of adjusting the position of nose portion 12 and 112 is shown in FIG. 4A, where a series of indentations 25, 26, 27, and 125, 126, and 127, are formed in frame plate 22. A biased ball 28 is held in cavity 29 downwardly by a spring 30 to hold nose 12 in its outermost position. It can be understood that a rider can merely squeeze the nose portions 12 and 112 together and move ball 28 from indentation 25 to, for instance, indentation 26 or 27. Of course, a screw tightenable against a slot or other adjustment means may alternatively be used as shown in FIG. 6. In FIG. 6 a plate 22 is affixed to base 21 by screws 33 and has a pair of slots 31 and 131 formed therein. Screws 32 and 132 pass into nose portions 12 and 112 and may be loosened for adjustment of the spacing between the nose portions and then tightened. Screws 32 and 132 may have knurled knobs or may be wing nuts for facilitating hand adjustment.

A view of the seat from the front is shown. in FIG. 5. The distance between upper surface 15 and any sort of base floor, or the base 21, should be at least ½ inch to eliminate any pressure.

An alternate embodiment of bicycle seat 10 is shown in plan view in FIG. 7. The additional feature of this seat comprises depressions 34 and 134, which are recessed about ½ inch below the upper surface of rear portions 14 and 114. These depressions or chambers 34 and 134 provide additional relief of pressure on the pudendal arteries. They preferably extend about 4 inches from the rear edge 19 and 119 and have a maximum width of 1 to 1½ inches.

The bicycle seat of the present invention is exceptionally comfortable to use even for very long periods of riding. It is light in weight, attractive in appearance, and streamlined. Various areas of gel or softer padding known to those skilled in the art to eliminate areas of known discomfort.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A bicycle seat comprising:

a base including means for attaching the seat to a bicycle;

a right side portion held to said base, said right side portion having a right side nose portion, a right side intermediate portion, and a right side rear portion and said right side nose portion including a right side nose upper surface, a right side nose outer side surface curved downwardly from said right side nose upper surface and a right side nose inner side surface curved downwardly from said right side nose upper surface and said right side nose outer side surface and said right side nose inner side surface terminate at a right side front edge; and a left side portion also held to said base, said left side portion having a left side nose portion, a left side intermediate portion, and a left side rear portion and said left side nose portion including a left side nose upper surface, a left side nose outer side surface curved downwardly from said left side nose upper surface and a left side nose inner side surface curved downwardly from said left side nose upper surface and said left side nose outer side surface and said left side nose inner side surface terminate at a left side front edge and said right side nose inner side surface of said nose portion of said right side portion and said left side nose inner side surface of said of said nose portion of said left side portion are separated a distance of at least one and one half inches and wherein said right side nose inner side surface and said left side nose inner side surface are angled outwardly adjacent said right and left side front edges.

2. The bicycle seat of claim 1 wherein a separation distance between said right side nose inner side surface and said left side nose inner side surface is adjustable.

3. The bicycle seat of claim 2 wherein said right and left side nose portions are hingedly movable at said right and left side intermediate portions respectively.

4. A nose width adjustable bicycle seat comprising:

a base including means for attaching the seat to a bicycle and said base having right and left side nose securement areas near a forward position of said base, said base having a central longitudinal axis;

a right side portion held to said base, said right side portion having a right side nose portion, a right side intermediate portion, and a right side rear portion and said right side nose portion including a right side nose upper surface, a right side nose outer side surface curved downwardly from said right side nose upper surface and a right side nose inner side surface curved downwardly from said right side nose upper surface and said right side nose outer side surface and said right side nose inner side surface terminate at a right side front edge and said right side nose portion being affixable in a plurality of positions by said right side nose securement means at a plurality of spacings from said central longitudinal axis; and a left side portion also held to said base, said left side portion having a left side nose portion, a left side intermediate portion, and a left side rear portion and said left side nose portion including a left side nose upper surface, a left side nose outer side surface curved downwardly from said left side nose upper surface and a left side nose inner side surface curved downwardly from said left side nose upper surface and said left side nose outer side surface and said left side nose inner side surface terminate at a left side front edge and said left side nose portion being affixable in a plurality of positions by said left side nose securement means at a plurality of spacings from said central longitudinal axis and wherein said right side nose portion and said left side nose portion independently pivot about a pivot point at a rear area of said right side nose portion and said left side nose portion so that the right and left side nose portions can be adjusted without affecting the right side rear portion and said left side rear portion.

5. The nose width adjustable bicycle seat of claim 4 wherein said right and left side nose securement means function independently of each other.

6. The nose width adjustable bicycle seat of claim 5 wherein said right and left side nose securement means comprise a detent and ball securement structure.

7. The nose width adjustable bicycle seat of claim 4 wherein said right and left side intermediate portions are separated by a gap on a right side and a left side of said central longitudinal axis.

8. The nose width adjustable bicycle seat of claim 7 wherein said right and left side rear portions are separated by a gap on a right side and a left side of said central longitudinal axis.

* * * * *